United States Patent [19]

McGee et al.

[11] 4,125,060

[45] Nov. 14, 1978

[54] DAMPED FLUID PRESSURE VALVE OPERATOR WITH SELECTIVE BACK SEAT

[75] Inventors: John K. McGee; Floyd J. Lane, both of Houston, Tex.

[73] Assignee: Combustion Engineering, Inc., Windsor, Conn.

[21] Appl. No.: 800,019

[22] Filed: May 24, 1977

[51] Int. Cl.² .................. F15B 15/22; F15B 15/24
[52] U.S. Cl. ............................. 92/59; 92/8; 92/13.6; 92/128; 92/130 D
[58] Field of Search .............. 92/8, 9, 130 R, 130 D, 92/128, 59

[56] References Cited

U.S. PATENT DOCUMENTS

| | | | |
|---|---|---|---|
| 1,043,399 | 11/1912 | Cole | 92/130 R |
| 1,706,812 | 3/1929 | Pfau | 92/9 |
| 2,896,541 | 7/1959 | Barton | 92/130 D |
| 3,176,801 | 4/1965 | Huff | 92/9 |
| 3,789,875 | 2/1974 | McGee | 137/553 |

*Primary Examiner*—Paul E. Maslousky
*Attorney, Agent, or Firm*—Cushman, Darby & Cushman

[57] ABSTRACT

An actuator, in which fluid pressure on a piston advances a stem against retractive force provided by a spring, a hydraulic dashpot is provided for the stem, and a stroke varying cushion is used for preventing engagement of a back seat between the stem and housing except when a seal is desired.

1 Claim, 2 Drawing Figures

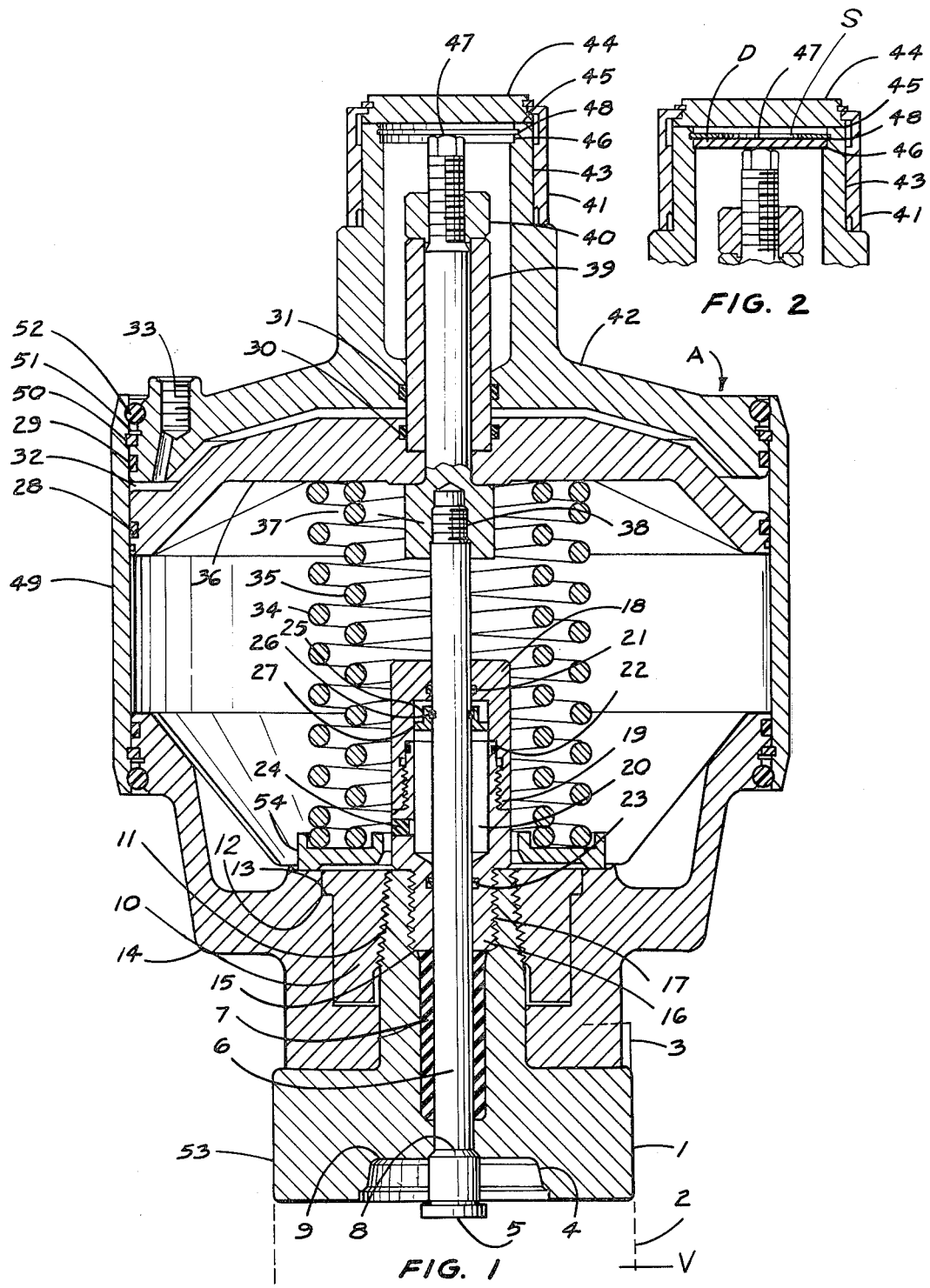

DAMPED FLUID PRESSURE VALVE OPERATOR WITH SELECTIVE BACK SEAT

BACKGROUND OF THE INVENTION

It is known in the art to provide automatically or semi-automatically operated means for advancing and retracting an apparatus element.

A ready example is the fluid-powered actuators provided for opening and closing gate valves from remote sites.

One example of a prior art fluid-pressure actuated gate valve operator is disclosed in working association with a gate valve in the prior U.S. Patent of McGee, No. 3,789,875, issued Feb. 5, 1974.

It is not uncommon in such valve actuators, where a reciprocating stem passes out of the bonnet of the valve housing through a packing annulus, to provide a metal-to-metal seal between the stem and the bonnet, to permit the valve packing to be changed while the valve remains installed and in service.

Such a metal-to-metal seal is shown, though unnumbered, in FIG. 3 of the aforesaid McGee patent, as mating frusto-conical surfaces on the stem 254 and the housing bonnet 258, near the lower end of the stem 254.

Another example is shown in the prior U.S. Patent of Dyson, No. 3,219,056, and the prior U.S. Patents of Donneley, No. 551,370, Scott, No. 667,797 and Schmitt, No. 738,362 show others.

It is also known to provide a dashpot or shock absorber for the stem of a fluid-powered actuator to guard against undue loading.

The aforesaid Dyson patent shows one such device, and the prior U.S. Patents to Collin et al., No. 534,360, Parsons et al., No. 846,692 and Holmes, No. 1,778,191 show others.

SUMMARY OF THE INVENTION

An actuator, in which fluid pressure on a piston advances a stem against retractive force provided by a spring, a hydraulic dashpot is provided for the stem, and a stroke varying cushion is used for preventing engagement of a back seat between the stem and housing except when a seal is desired.

Preferably, the back seat is used only in case of stem seal leakage or when it is necessary to change actuator parts. At other times, use of a disk between the outer end of the stem and the inside of the actuator housing prevents the back seat from mating and thus prevents unnecessary wear. The use of the disk also provides stroke adjustment. Because the packing annulus about the stem is usually providing sealing, it has a reduced tendency to leak.

The hydraulic shock absorber provided between the main actuator piston and the stem dampens the first surge that occurs when the actuated valve, or the like, begins to open. This provides a smoother operation with less noise, vibration and potential for damage to the system.

The dashpot dampening piston feature and the selective back seat are combined to form a controllable system to protect the metal-to-metal seal back seat device during normal operation, while at the same time dampening the closure force that is inherent when a positive stop is utilized to limit the upward travel of the operator piston. (In prior art valve operator arrangements having the selective back seat, upward travel is limited by engagement of the back seat, thus transmitting undue force to the metal-to-metal seal area.)

The importance of the above arrangement lies in a smoothly operating valve free of damaging limiting force and provision of the ability to effect a metal-to-metal back seat seal when it is most needed.

The principles of the invention will be further discussed with reference to the drawing wherein a preferred embodiment is shown. The specifics illustrated in the drawing are intended to exemplify, rather than limit, aspects of the invention as defined in the claims.

BRIEF DESCRIPTION OF THE DRAWING

In the Drawing:

FIG. 1 is a longitudinal sectional view of an actuator provided in accordance with the present invention, with its back seat preventer removed; and FIG. 2 is a fragmentary longitudinal sectional view of the actuator of FIG. 1, with its back seat preventer disk installed.

DETAILED DESCRIPTION OF THE PRESENTLY PREFERRED EMBODIMENT

Flange 1 of the actuator A is bolted to flange 2, of the valve V or other device requiring a push-pull motion, by means of bolt 3 to form a fluid seal on surface 4 with a seal ring (not shown) between flanges 1 and 2. Shoulder 5 on the end of stem 6 connects with the part to be actuated such as a valve gate, a globe valve head, etc. Suitable sealing material in chamber 7, slidably seals around stem 6, against fluid pressure contained below flange 1.

When stem 6 is in its uppermost position, shoulder 8 of stem 6 contacts shoulder 9 of flange 1 which effects a seal and also serves to prevent further movement of stem 6 in that direction.

Nut 10 cooperates with threads 11 on flange 1 to pull down with shoulder 12 of nut 10 against shoulder 13 of actuator base 14 to secure it firmly to flange 1. Sealing material in chamber 7 is retained by shoulder 15 of bushing 16 which is threadably engaged with flange 1 by means of threads 17. Cap 18 is secured to bushing 16 by threads 19 to form annular chamber 20 around stem 6. Oil contained in chamber 20 is retained by seals 21, 22, 23 and by pipe plug 24. Piston 25 is secured to stem 6 by ring 26. Any axial movement of stem 6 is dampened because of the time required for the oil in chamber 20 to pass through the annular gap 27.

Seals 28, 29, 30 and 31 retain fluid pressure within chamber 32 when injected through port 33. When pressure within chamber 32 is great enough to overcome springs 34, 35 and upward forces on stem 6, then piston 36 is forced downward, thereby forcing down extension 37 which in turn forces down stem 6 and the device to be actuated attached to shoulder 5. When control pressure in chamber 32 is caused to drop sufficiently, upward forces on stem 6 and springs 34 and 35 serve to return stem 6 to its upper limit of travel.

Extension 37 is secured to stem 6 by means of threads 38 and traps sleeve 39 between nut 40 and piston 36, thereby causing stem 6, extension 37, sleeve 39, and nut 40 to move as a unit.

Nut 41 is secured to top 42 by means of threads 43 and it traps flange 44 against shoulder 45 of top 42. Flange 44 as shown, does not contact the upper end 47 of stem 6 and therefore does not limit travel of stem 6. However, should a disk D (FIG. 2), be inserted within bore 46 of top 42, and be of sufficient thickness so that it contacts the upper end 47 of stem 6 before shoulder 8 of stem 6 contacts shoulder 9 of flange 1, then no seal will be effected between shoulders 8 and 9. This then produces an ability for the user to select or prevent the stem back seat feature as desired. The disc D may be retained by a conventional snap ring S within groove 48, or by any other appropriate means.

Cylinder 49 is secured to base 14 and top 42 by means of shear ring 50 which in turn is retained by snap ring 51. Weather seal 52 protects against corrosion and clogging elements.

The actuator working parts and/or the stem packing may be replaced while the valve V is still under line pressure. All parts shown except 1, 3 and 6 may be removed from flange 2 if the seal between shoulders 8 and 9 has been effected. This is of great advantage should defective parts need replacing or a different operator needed on a valve that must remain under line pressure.

Should a disc D be in bore 46 to hold off the back seat it must be removed after first removing parts 41, 44 and retainer in groove 48 if any. Control pressure should be dropped in chamber 32 to allow shoulders 8 and 9 to contact and their seal should be tested through port 53. If a seal has been effected, then the parts can be removed in the following order: 52, 51, 50, 42, 40, 39, 36, 34, 35, 54, 10, 14 and if necessary 37, 18, 26, 25, 16, and stem packing in chamber 7.

By preference the actuator parts have the shapes and interrelationships that are shown in the drawing.

It should now be apparent that the damped fluid pressure valve operator with selective back seat as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. In a fluid pressure-powered actuator for operating a valve or the like by a push-pull motion, apparatus comprising:
    a housing enclosing a chamber, and including means defining a bore communicating through the housing with the chamber;
    a piston slidably received in the chamber;
    means for admitting pressurized fluid to the chamber on one side of the piston for urging the piston to slide along in one direction therein;
    compression coil spring means received in the chamber and reacting against the housing and the opposite side of the piston for urging the piston to slide along in the opposite direction therein from said one direction;
    an actuator stem received in said chamber and passing out thereof through said bore;
    fluid-filled dashpot-type shock absorber means between the actuator stem and the housing for damping attempted rapid axial movement of the actuator stem;
    a packing annulus sealing between the actuator stem and the housing contiguous with said bore;
    means defining a coaxially annular seat on said housing circumferentially of where the actuator stem emerges from said bore;
    means defining a coaxially annular shoulder on said actuator stem, for engagement with said annular seat upon movement of said piston in said opposite direction until said shoulder abuts said seat, to provide a seal between the actuator stem and the housing independently of said packing annulus;
    a spacer element removably interposed wholly within the housing between the piston, on said one side thereof, and said housing, for preventing, only while installed, the piston from sliding sufficiently in said opposite direction to engage said seat with said shoulder; said housing including removable access cover means situated to permit installation and removal of said spacer element; and
    surface means on said actuator stem, axially beyond said shoulder, for connecting said actuator stem to such device as is to be pushed and pulled thereby, said piston including an axially elongated extension projecting axially oppositely of said actuator stem; said housing including a top end wall having an axially outwardly extending tubular neck portion; said access cover means being removably secured on the outer end of said tubular neck portion; said tubular neck portion having means defining a circumferentially extending axially outwardly facing annular seat formed internally thereof near the outer end thereof; said spacer element being constituted by a disk seated on said annular seat and retainer means within said neck retaining said disk on said annular seal.

* * * * *